May 7, 1935. C. A. HOCHWALT 2,000,842
PIGMENT
Filed Jan. 31, 1931
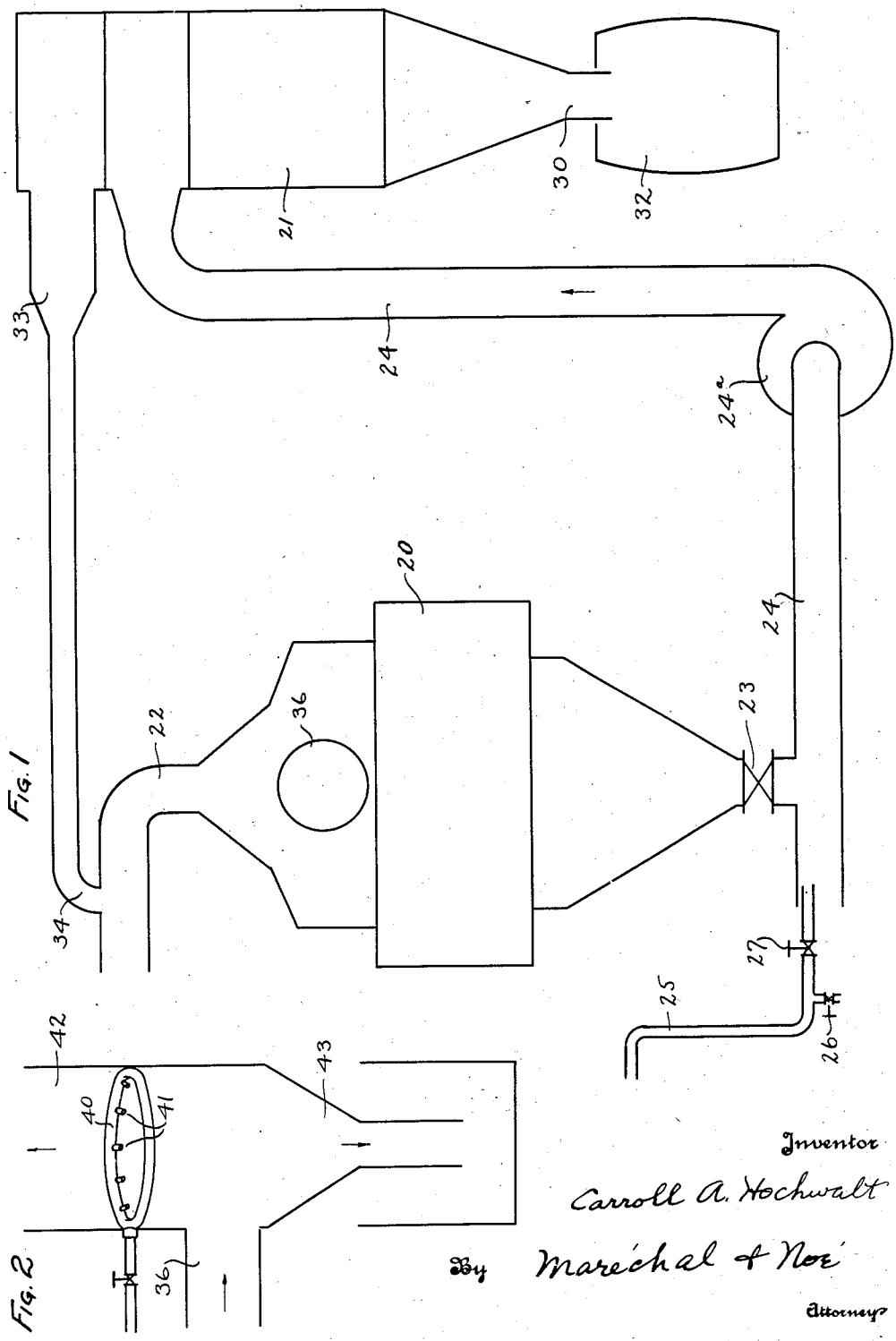
Inventor
Carroll A. Hochwalt
By Maréchal & Noe
Attorneys Patented May 7, 1935

2,000,842

UNITED STATES PATENT OFFICE 2,000,842

PIGMENT

Carroll A. Hochwalt, Dayton, Ohio, assignor to The Mead Research Engineering Company, Dayton, Ohio, a corporation of Ohio Application January 31, 1931, Serial No. 512,530

8 Claims. (Cl. 134—59)

This invention relates to pigment and its manufacture.

One of the principal objects of this invention is to produce a superior pigment of good color and fine particle size at a relatively low cost.

Another object of the invention is to produce a pigment having high dielectric strength and good non-settling qualities when used with coating materials.

Another object of the invention is to provide a method of producing pigment of this character which is simple and easily carried out, and which permits utilization of relatively cheap by-product materials with the production of a high grade pigment.

Other objects and advantages of the invention will be apparent from the following description and appended claims.

In the drawing, Figs. 1 and 2 are diagrammatic illustrations of apparatus constructed for carrying out the method and producing the production of this invention.

It has been discovered that a high grade water insoluble pigment can be prepared in accordance with this invention from tannin extract, which is the leach liquor resulting from the steeping of certain types of fibrous material containing tannin ingredients with leach liquor such as water. A method and apparatus for producing a pigment of this type from tannin extract is described in the copending application of Charles A. Thomas and Carroll A. Hochwalt, Serial No. 447,535, filed April 26, 1930. By way of example this invention is particularly described herein with reference to the treatment of tannin extract derived from leached chestnut chips. In preparing leach liquor which is used in this invention, the wood is reduced to small pieces or chips of a size such as that suitable for boiler fuel. This may be done in any desired manner, as by a chipper of conventional construction having revolving grinders or shredders for reducing logs to chip size. The resulting chips are treated with water and steam in suitable leach tanks, as for example in tanks having liquor circulating connections so that the liquor may be passed through the desired number of tanks in series in the customary manner as practiced in the tannin extract industry. After the extraction operation and the draining and removal of the extracted chips, the extract liquor is discharged into suitable evaporating apparatus, such as conventional multiple effect evaporators. In these evaporators the extract liquor is concentrated to a suitable consistency, generally to a viscous mass of the consistency of thick molasses. If desired, the extract liquor may be used in relatively dilute consistency as received from the extract tank without concentration.

The pigment precipitate is produced by introducing the leach liquor into a suitable mixing tank containing a prepared solution of a heavy metal compound such as an iron compound. Preferably ferrous sulfate is used inasmuch as it is a by-product available at low cost. A calculated amount of the ferrous sulphate solution is first introduced into the mixing tank, and then a proportional quantity of a suitable alkaline compound which is active to react with the ferrous sulfate to produce ferrous hydroxide is introduced. The reaction mixture is agitated by a high speed stirrer. A readily soluble alkaline compound is preferably used such as compounds of the alkali metals including ammonia, which is active to precipitate ferrous hydroxide in the reaction mixture. Thus satisfactory results may be secured with alkali metal hydroxides and carbonates, for example sodium carbonate, sodium hydroxide or a mixture of these may be used. It is found preferable to prepare the ferrous hydroxide at the time of use inasmuch as this compound is unstable. It has been found desirable to filter the ferrous sulfate solution before using to produce ferrous hydroxide, thereby removing oxidized iron and objectionable impurities which may be found in the technical grade of ferrous sulfate used. This filtration may be done in any convenient manner, as in a conventional type filter press. It has also been found that the use of leach liquor in relatively concentrated form is more economical, due to inconveniences of handling very large quantities of the solution. A satisfactory measure of the concentration of leach liquor has been found to be the amount of solid material present, that is, total solids as determined by drying at 100° C. Leach liquor containing 25 to 60% total solids is found practical for use, the usual leach liquor produced in the tannin extract industry containing from 35–50% total solids.

Where an alkali metal carbonate, such as sodium carbonate, is used as the alkaline material for converting the ferrous sulfate into ferrous hydroxide, the resulting pigment is found to have a reddish undertone but the pigment particle size is exceedingly fine. When sodium hydroxide is used the pigment has a black body color, but the particles are relatively coarse. It has been discovered that when a mixture of sodium carbonate and sodium hydroxide is used as the alkaline material for converting the ferrous sulfate into ferrous hydroxide, the resulting pigment has the smoothness and fineness of particles characteristic of the pigment produced by the use of sodium carbonate, and at the same time the black body color usually produced by use of sodium hydroxide. Thus a pigment having good body color and satisfactory fineness may be produced by using mixtures of sodium carbonate and sodium hydroxide in proportions from 20% sodium carbonate and 80% sodium hydroxide, to 80% sodium carbonate and 20% sodium hydroxide. A mixture of sodium carbonate and sodium hydroxide in the proportions of approximately 75% sodium carbonate and 25% sodium hydroxide has been found to give excellent results as to both color and smoothness, the excess of sodium carbonate being preferred because of the lower cost of the carbonate.

It has also been found that the addition of certain film-forming materials such as drying oils, non-drying oils, semi-drying oils and petroleum oils, during the precipitation of the pigment, increases the tinting power of the pigment, gives it good non-settling qualities, smoothness and fineness, and tends to minimize the danger of spontaneous combustion of the finished pigment. Pigment produced in this manner is of a fluffy, flocculent appearance, is very fine and soft and very easily wetted and ground into the vehicle. When this pigment is mixed with coating materials in the usual manner, it does not settle to the bottom of the container to form a hard cake which cannot be remixed, but any settled pigment is in a soft condition and may be readily reincorporated with the coating material by stirring before use. The effect produced in this pigment by such film forming materials is not entirely understood. It is believed, however, that very thin films are formed surrounding each very fine particle of pigment precipitate, and that such films serve to keep these particles separated from each other, thus giving the fluffy appearance characteristic of this pigment, and preventing settling of the particles into a hard cake. Such films, it is believed, also tend to prevent the rapid oxidation or hydration of such fine pigment particles, which is believed to cause spontaneous combustion. Various materials which form colloidal suspensions or solutions and have such film-forming properties, and which are non-volatile during the treatment to which the pigment is subjected in drying, may also be used in the manner described. Proportions of film-forming material from 5 to 15% by weight, based on the weight of the tannin extract used, have been found to produce a good grade of non-settling pigment, having tinting strength approximately 30% better than that of bone black. Various oils have been found satisfactory for this purpose, such as soya bean oil, red oil (oleic acid), cotton seed, corn and peanut oils, and petroleum oils such as a medium grade of lubricating oil. On account of its cheapness and availability the use of lubricating oil is described in the example given.

The pigment precipitate of this invention can be obtained from substantially all proportions of tannin extract and precipitating agent, and the proportions best suited to produce a maximum yield of good grade precipitate, using a particular tannin extract and under specific conditions of plant operation, can readily be determined by simple test. By way of example, the following proportions and materials are described as producing a satisfactory yield of good quality pigment.

Approximately 210 pounds of ferrous sulfate (technical grade) are dissolved in from 75 to 100 gallons of water at a temperature of about 85° C. and the mixture is then filtered in any convenient manner, as for example passed through a small filter press. The filtrate is allowed to run into about 100 gallons of water contained in a suitable mixing tank provided with a high speed stirrer, such as mentioned above. The filter is then washed with about 200 gallons of water, the wash water being discharged into the same mixing tank. Approximately 60 pounds of technical sodium carbonate are dissolved in about 50 gallons of hot water, and about 16 pounds of technical solium hydroxide are dissolved in about 5 or 6 gallons of water. These solutions of sodium carbonate and sodium hydroxide are then added to the ferrous sulfate solution in the mixing tank and mixed with a mechanical mixer. During the agitation and formation of the ferrous hydroxide suspension, about 5 gallons of medium lubricating oil are added, and the whole mixed for a short time, for example about ¼ to ½ hour. The desired amount of tannin extract is then introduced while the mix is being agitated by the high speed stirrer, about 345 pounds of an extract containing approximately 40% total solids, being used with the proportions indicated above. The reaction mixture at this time is dark brown in color, being of a colloidal nature. The mix is then treated with an oxidizing medium such as by bubbling air under pressure through the mass. Considerable foaming takes place when the air blast treatment is started and the treatment with air is generally maintained until this foaming has substantially ceased. This operation with quantities as given above usually requires from one to two hours. During this treatment, a bluish-black precipitate settles out of the solution, this precipitate being water insoluble. The exact composition of this precipitate is not definitely known but it is probably a precipitate of iron tannate and complex compounds of iron with non-tannins. If desired the mixing tank and its contents may be heated by a suitable heating jacket having valve controlled steam or water inlet and outlet connections.

After the air blast treatment, the reaction mixture is filtered, any conventional type of filter press being used, preferably while hot, the precipitate remaining on the filter while the filtrate is discharged to any convenient outlet. By filtering the mixture while hot, the alkali metal sulfate such as sodium sulfate which is formed in the reaction, is maintained in solution and does not precipitate to objectionably lighten the color or otherwise impair the quality of the pigment. The precipitate is then washed by means of hot water until water soluble compounds have been substantially removed and the filtrate is free from sulfates. Care is taken to not permit the filter cake to dry, inasmuch as it has a tendency to cake together, and it is desirable to maintain as fine a particle size of the precipitate as possible.

After washing, the filter cake, which generally retains a considerable proportion (about 60 to 70%) of water in the cake, is forced out of the press and discharged into an agitating tank provided with suitable agitating mechanism.

In the agitating tank water is added to facilitate agitation and pumping of the mixture.

Enough water is usually added to bring the solid content of the slurry-like mixture to about 5 to 10% (by weight). In the agitating tank this mixture is broken up into a very fine particle size, and is in the form of a water suspension. After the material is broken up into suitable particle size, the suspension is pumped from the agitating tank to a suitable reservoir tank. The material in the reservoir tank is kept constantly agitated, a satisfactory form of agitation being a recirculating pumping means, such as a centrifugal pump which delivers the material back into the top of the reservoir tank so that the precipitate suspension is recirculated and so kept constantly agitated. From the reservoir tank the precipitate suspension is introduced as desired into a suitable atomizer of a spray drier. Here the precipitate is introduced into heated air currents so as to effect rapid drying, while at the same time avoiding undue heating which is apt to produce decomposition of the precipitate with resulting deterioration in the quality and color of the pigment.

A very satisfactory form of spray drier for this purpose is that known as the Peebles spray drier. This comprises a desiccating tank into which highly heated air is blown from a suitable heater or oil burning furnace. The heated air is introduced centrally of the top of the desiccator through a diffusion ring which imparts a whirling or vortex motion to the highly heated air column within the desiccator. Mounted at the top of the desiccator is a steam turbine or electric motor which drives an atomizer at a high rate of speed such as about 12,000 to 15,000 R. P. M. Air from atmosphere is drawn into the desiccator from the top during operation. Intake and discharge pipes are so arranged in the desiccator as to set up a whirling motion of cooling air within the heated portion of the desiccator opposite in direction to the whirling motion of heated air which enters the top of the desiccator. This sets up a counter vortex of air within the desiccator so that the whirling highly heated air is at all times surrounded by oppositely whirling currents of cool air and so that the heated air is confined to a central column.

In the operation of the spray drier the suspension of pigment is atomized into a very fine particle size by a high speed atomizing disk. These fine particles are thrown outwardly through a zone or small extent of highly heated air such as air at about 180° to 200° C., and thence into areas of cool air. The fine particles of pigment are thus subjected to the highly heated air only for a fraction of a second, and then passed into the cooler zone so that their character is not injured, although effective drying is secured. The air currents with the pigment entrained therein are forced out through a suitable discharge pipe. This pipe is of such size, or is so controlled by its valve, that only a relatively small proportion of the air with entrained pigment is returned to the desiccator. In any event the pigment which is recirculated in this manner is not again subjected to the highly heated zone of air, but is discharged only into the outer whirling zone of cooler air within the desiccator.

The major portion of the air currents with entrained pigment passes through a valve controlled discharge pipe into a separator or precipitating device, such as a Cottrell precipitator or mechanical multiclone separator. This type of precipitator is diagrammatically illustrated in the accompanying drawing. Referring to Fig. 1 of the drawing, 20 and 21 indicate mechanical precipitators of the multiclone separator type, 20 being relatively larger than 21. Air currents carrying the fine pigment particles pass through valve controlled discharge pipe 22 leading into multiclone separator 20. The particles of pigment are here separated from the air currents and pass through a valve 23, dropping into the pipe 24, and are then propelled by any suitable means such as the fan 24—a, through a current of steam into pipe 24. Steam is admitted to pipe 24 through an inclined inlet pipe 25 having an outlet valve 26 at its lowest point. Any condensate is drawn off from time to time through this valve, a current of relatively dry steam thus being admitted to pipe 24 controlled by inlet valve 27. It is found that treatment of the pigment particles with steam in this manner produces a partial hydration of the pigment which minimizes the tendency to spontaneous combustion which is characteristic of such extremely finely divided materials. Pigment which has been hydrated in this manner so that it contains from 6% to 12% water of crystallization, is found to be entirely safe from danger of spontaneous combustion when packed in bags of 40 pounds or less and free from pressure. Water of crystallization is determined in the following manner: The finished pigment is dried at 50° C. at atmospheric pressure for about 48 hours, weighed and then dried to constant weight in a vacuum drier at 50° C. The loss in weight is taken as the water of crystallization. The steaming treatment required to produce such hydration will depend on various features, such as distance from steam source, length of pipe 24, steam pressure at source and the like, and may be determined by trial and adjusted as desired. It is desirable that the time of contact of the pigment with the steam be controlled so that the formation of a slurry with the pigment or coagulation of the fine pigment particles is prevented. It has been found that the desired degree of hydration may be obtained by passing the pigment through a current of steam for a distance of about three feet, the steam containing pipe being about four inches in diameter, and the rate of flow being such that the pigment remains in contact with the steam for approximately 2-5 seconds. Steam pressure at source in this case is about 75 pounds, and the distance from the source to the pipe 24 is about 100 feet.

The hydrated pigment particles are propelled by the fan 24—a through the pipe 24 into a smaller separator 21, preferably of the multiclone type as mentioned above. Here the pigment particles are separated from the air current and dropped through the discharge opening 30 into a suitable container 32, which preferably is adapted to fit the mouth of the discharge opening so as to prevent loss of the pigment. A very slight vacuum is maintained in the separator 21 by a tube (not shown) connected with the suction side of the discharge fan in the system. The velocity of the carrier fluid is thus reduced and loss of pigment at the discharge point is thus prevented. During the separation in the multiclone separators 21 and 20 the direction of the incoming air currents is reversed, the air in separator 21, substantially free from pigment, passing out through exhaust pipe 33 and reentering the inlet pipe 22 as shown at 34. In this manner any unrecovered pigment is returned to the separators. In a similar manner, the exhaust air from separator 20 passes to atmosphere through outlet 36.

To prevent loss of pigment and also to prevent contamination of the atmosphere this discharge outlet 36 from separator 20 is fitted with a water spray device, such as that illustrated in Fig. 2. Water is conveyed from a suitable source (not shown) to a ring shaped pipe 40 positioned above the discharge opening 36, and fitted with a plurality of nozzles 41, such nozzles being inclined inwardly so as to direct the spray toward the center of the discharge pipe 42. Exhaust air from the separator 20 (Fig. 1) discharged through the outlet 36, enters the pipe 42. The entrained pigment is carried down with the water sprayed with nozzles 41 and is discharged at the discharge outlet 43, and may be stored to be used as make-up water in the mixing tank or returned to the system at any desired point. The exhaust air free from pigment is discharged to atmosphere through the pipe 42.

Thus, in accordance with this invention a high grade pigment is produced from two by-products, namely, tannin extract and ferrous sulfate, both of which are quite cheap. The pigment so produced is bluish-black in color, fluffy or flocculent in appearance and is of very satisfactory fineness, residue on a 325 mesh sieve being less than 0.5%.

The oil absorption value of this pigment has been found to be about forty pounds raw linseed oil to one hundred pounds pigment, while that of "drop-black" or bone black is about 46 pounds oil to 100 pounds pigment, and that of carbon black is about 93–114 pounds oil to 100 pounds pigment. Due to this low oil absorption value the pigment is easily wetted and readily adapted to use with various vehicles. Due to its softness and smoothness the pigment is very easily ground and dispersed in a vehicle. The pigment has excellent tinting properties, its tinting power having been found to be about 30% better than that of bone black. The pigment is also found to have very unusual dielectric properties. In a given film, tests show for carbon black, lamp black and bone black, voltage puncture limits of 10 to 30 volts per mil. The same tests on a similar film using the pigment of this invention show voltage puncture limits of approximately 660 volts per mil. This property makes the pigment of this invention particularly valuable for use in coating materials, such as paints, varnishes, and the like, to be used for insulating purposes and the like. The pigment is substantially neutral in reaction and does not retard the drying properties of linseed oil. The pigment produced in accordance with this invention is also found to have satisfactory non-settling qualities, that is, when used with protective coating materials the pigment does not settle to form a hard cake at the bottom of the container. For these reasons the pigment is particularly suitable for use in protective coating materials. It is also adapted for use in molding compositions or in making molded articles, such as are produced by the cold molding process where high temperatures and pressures of molding are avoided.

While the forms of invention herein described constitute preferred embodiments of the invention, it is to be understood that the invention is not limited to these precise forms and that changes may be made therein without departing from the scope of the invention which is defined in the appended claims.

What is claimed is:

1. In the manufacture of pigment, the method which comprises mixing ferrous hydroxide with a non-alkaline tannin extract derived from chestnut wood, and film forming oil to form a non-alkaline mixture, bubbling an oxidizing gas such as air through the non-alkaline mixture to produce a copious rapid settling bluish black precipitate in which the oil is entrained and dispersed, and separating, washing and drying the resultant precipitate without substantial vaporization of the oil to provide a water insoluble, fluffy, flocculent, bluish black pigment of fine particle size containing the entrained and dispersed oil.

2. In the manufacture of pigment, the method which comprises mixing a water solution of ferrous sulphate with substantially the chemical equivalent amount of an alkali metal compound active to form ferrous hydroxide by reaction with the ferrous sulphate, adding film forming oil to the reaction mixture, adding tannin extract derived from chestnut wood to the reaction mixture while agitating to provide a non-alkaline mixture, bubbling an oxidizing gas such as air through the non-alkaline mixture to produce a copious rapid settling bluish black precipitate in which the oil is entrained and dispersed, and separating, washing and drying the resultant precipitate without substantial vaporization of the oil to provide a water insoluble, fluffy, flocculent, bluish black pigment of fine particle size containing the entrained and dispersed oil.

3. In the manufacture of pigment, the method which comprises mixing a water solution of ferrous sulphate with substantially the chemical equivalent amount of a mixture consisting of 20% to 80% by weight of sodium carbonate and 80% to 20% by weight of sodium hydroxide to produce ferrous hydroxide by reaction with the ferrous sulphate, mixing the reaction mass with tannin extract derived from chestnut wood to provide a non-alkaline mixture, bubbling an oxidizing gas such as air through the non-alkaline mixture to produce a copious bluish black precipitate, and separating, washing and drying the resultant precipitate to provide a water insoluble, fluffy, flocculent, bluish black pigment substantially free from a reddish undertone and having a fine particle size.

4. In the manufacture of pigment, the method which comprises mixing a water solution of ferrous sulphate with substantially the chemical equivalent amount of a mixture consisting of substantially 75% by weight of sodium carbonate and substantially 25% by weight of sodium hydroxide to produce ferrous hydroxide by reaction with the ferrous sulphate, mixing the reaction mass with tannin extract derived from chestnut wood to provide a non-alkaline mixture, bubbling an oxidizing gas such as air through the non-alkaline mixture to produce a copious bluish black precipitate, and separating, washing and drying the resultant precipitate to provide a water insoluble, fluffy, flocculent, bluish black pigment substantially free from a reddish undertone and having a fine particle size.

5. In the manufacture of pigment, the method which comprises mixing ferrous hydroxide with a non-alkaline tannin extract to form a non-alkaline mixture, bubbling an oxidizing gas such as air through the non-alkaline mixture to produce a copious rapid settling bluish black precipitate, separating, washing and drying the resultant precipitate, and then hydrating the dried precipitate to provide a water insoluble bluish black pigment containing water of crystallization.

6. In the manufacture of pigment, the method which comprises mixing ferrous hydroxide with a non-alkaline tannin extract and an oily material to form a non-alkaline mixture, bubbling an oxidizing gas such as air through the non-alkaline mixture to produce a copious rapid settling bluish black precipitate in which the oily material is entrained and dispersed, and separating, washing and drying the resultant precipitate without substantial vaporization of the oily material to provide a water insoluble bluish black pigment of fine particle size containing the entrained and dispersed oily material, and then passing the dried precipitate in suspended form through an atmosphere of steam to provide a water insoluble bluish black pigment containing water of crystallization.

7. A pigment comprising the water insoluble bluish black precipitate containing entrained and dispersed oil, which is the oxidized reaction product of a non-alkaline mixture of ferrous hydroxide and tannin extract derived from chestnut wood and containing a film forming oil, the pigment being finely divided, fluffy, flocculent, substantially neutral, having a tinting strength greater than bone black and non-settling properties, and possessing high dielectric strength and showing in a protective coating film voltage puncture limits of over 600 volts per mil.

8. A pigment comprising the water insoluble bluish black solid containing water of crystallization which is the hydrated dried reaction product of oxidation of a non-alkaline mixture of ferrous hydroxide and tannin extract, the pigment being finely divided, flocculent, substantially neutral, having a tinting strength greater than bone black and non-settling properties, and possessing high dielectric strength and showing in a protective coating film voltage puncture limits of over 600 volts per mil.

CARROLL A. HOCHWALT.